(12) United States Patent   (10) Patent No.: US 7,093,506 B2
Iiduka   (45) Date of Patent: Aug. 22, 2006

(54) FORCE MEASUREMENT CELL

(75) Inventor: Atsushi Iiduka, Toyonaka (JP)

(73) Assignee: Shimadzu Corporation, Kyoto (JP)

( * ) Notice: Subject to any disclaimer, the term of this patent is extended or adjusted under 35 U.S.C. 154(b) by 63 days.

(21) Appl. No.: 10/891,027

(22) Filed: Jul. 15, 2004

(65) Prior Publication Data

US 2005/0044970 A1   Mar. 3, 2005

(30) Foreign Application Priority Data

Aug. 25, 2003   (JP) .............................. 2003-299917

(51) Int. Cl.
   *G01L 1/04*   (2006.01)
(52) U.S. Cl. ................................ 73/862.637
(58) Field of Classification Search .... 73/862.621–639
   See application file for complete search history.

(56) References Cited

U.S. PATENT DOCUMENTS 6,354,159 B1 *   3/2002   Burkhard et al. ...... 73/862.637
6,817,255 B1 *   11/2004  Haque et al. .......... 73/862.638
2003/0131672 A1 *  7/2003   Norling et al. ........ 73/862.627

\* cited by examiner

*Primary Examiner*—Max Noori
(74) *Attorney, Agent, or Firm*—Manabu Kanesaka

(57) ABSTRACT

A force measurement cell having a block-like mechanism unit includes a Roberval mechanism and a lever mechanism formed by cutting out a single piece of parent material. The Roberval mechanism has a fixed part and a movable part on which a measured force acts. A gapped part is formed on either the lever mechanism or the Roberval mechanism following the vertical direction orthogonal to the axial direction of the lever mechanism and the Roberval mechanism, respectively. In addition, a stopper for restricting displacement of either the lever mechanism or Roberval mechanism is fixed to the fixed part of the block-like mechanism unit facing opposite the gapped part with a prescribed gap opened in the axial direction of either the lever mechanism or the Roberval mechanism. Another embodiment, includes a recessed part sinking from a respective side surface of the block-like mechanism unit formed on both side surfaces.

9 Claims, 7 Drawing Sheets

FORCE MEASUREMENT CELL

BACKGROUND OF INVENTION AND RELATED ART STATEMENT

The present invention relates to a force measurement cell, and in particular, to a force measurement cell suitable for use in an electromagnetic force balance type electronic balance.

An electromagnetic force balance type electronic balance generally has an electromagnetic force generator in which a movable coil is placed in a static electrical field generated by an electronic circuit, and the movable coil is attached to one end of a lever coupled with a tray. Also, the displacement of the lever due to a load to be measured on the tray is detected by a detector, the current flowing to the movable coil of the electromagnetic force generator is feedback-controlled such that the result of the detection always becomes zero, and the magnitude of the load to be measured is sought from the magnitude of the current necessary for zeroing the lever displacement.

The tray normally is supported by a Roberval mechanism which restricts displacement in the perpendicular direction in order to eliminate bias error. A Roberval mechanism has a structure in which a fixed part and a movable part are connected by two mutually parallel beams, above and below, each having flexible parts formed on both ends. The tray is attached to the movable part, and the movable part and the lever are connected by a flexible connecting member.

Among such electronic balances, one conventional type balance is constructed such that a block-like mechanism unit is formed by cutting out from a single piece of parent material a Roberval mechanism, a lever mechanism, and a connecting member connecting the Roberval mechanism and lever mechanism is used as a force measurement cell. The lever mechanism of the force measurement cell is connected to the movable coil of the electromagnetic force generator (see for example Japanese Utility Model Registration No. 2525318, hereinafter referred to as Patent Document 1).

In an electronic balance having a Roberval mechanism and a lever mechanism, in order to protect the beams of the Roberval mechanism and the movable members, such as the lever mechanism, from vibrations during transport and impact loads during use, and the like, conventionally, as exemplified in FIG. 7, it is common practice to provide a stopper 73 for restricting displacement of a lever 72 in the vicinity of the electromagnetic force generator 71. In the example shown in FIG. 7, a structure is adopted, in which a perpendicular pin 74 is attached to lever 72, and a hole 73a having a slight gap with respect to the outer perimeter surface of pin 74 is formed on stopper 73. By the protective mechanism using such stopper 73, the displacement of lever 72 in the horizontal direction is restricted to the gap between pin 74 and hole 73a.

Also, among electronic balances using a force measurement cell consisting mainly of a block-like mechanism unit, there is known one which has a protective mechanism for preventing the lever mechanism, and the like, inside the force measurement cell itself from being damaged by vibrations and impact loads, in addition to a protective mechanism such as described immediately above (see for example Japanese Unexamined Patent Publication No. H10-132643, hereinafter referred to as Patent Document 2).

The protective mechanism disclosed in Patent Document 2 has a structure in which a bolt (safety bolt) extending in the perpendicular direction is fixed to the fixed part of the block-like mechanism unit. In addition, a through-hole allowing passage having a minute gap interposed with respect to the outer perimeter surface of the bolt is formed on the lever being the movable part as well as on the beams, and is constructed such that displacement of the lever mechanism and the like can be restricted to the gap between the through-hole and the bolt even when under the action of vibrations during transport and impact loads during use, and the like.

While the protective mechanism having a stopper for restricting lever displacement in the vicinity of the electromagnetic force generator, which is commonly used in conventional electronic balances, functions effectively against comparatively small loads such as vibrations during transport, the protective mechanism may not function effectively against great impact loads, such as falling, because the displacement of the movable parts such as the lever is restricted in only one location.

In an electronic balance using a force measurement cell consisting mainly of a block-like mechanism unit, it is preferable that displacement of the movable parts, such as the lever mechanism, be restricted in two locations by providing a mechanism for protecting the movable parts inside the force measurement cell as disclosed in the aforementioned Patent Document 2, in addition to a protective mechanism provided in the vicinity of the electromagnetic force generator as described above.

However, in the technology disclosed in Patent Document 2, because a comparatively long bolt is screwed into the block-like mechanism unit and must be run through with a prescribed slight gap of about 0.1 mm with respect to through-holes formed on the lever mechanism and the beams of the Roberval mechanism in multiple locations in the longitudinal direction of the bolt, disadvantageously high precision machining is required both for the through-holes formed on the block-like mechanism unit and for the bolt. Further disadvantageously, higher precision machining increase the cost.

The present invention has been made in consideration of the above, and the present invention is to provide the provision of a force measurement cell capable of restricting displacement of the movable parts inside the block-like mechanism unit based on an inexpensive construction.

SUMMARY OF THE INVENTION

In order to solve the above problem, the force measurement cell according to an embodiment of the invention pertaining includes a block-like mechanism unit in which a Roberval mechanism having a fixed part and a movable part on which a measured force acts, which are connected by two mutually parallel beams each having flexible parts on both ends, and a lever mechanism which is connected to a flexible part of the Roberval mechanism and transmits a displacement of the movable part by a measured force to the outside, is formed by cutting out a single piece of parent material, wherein a protruding part or a recessed part is formed on the above lever mechanism following the vertical direction orthogonal to the axial direction of said lever mechanism, and in addition, a stopper for restricting displacement of the lever mechanism is fixed to the fixed part of the above block-like mechanism unit facing opposite the protruding part or recessed part with a prescribed gap interposed in the axial direction of the lever mechanism.

Also, in order to achieve the same purpose, the force measurement cell according to another embodiment of the invention includes a block-like mechanism unit in which a Roberval mechanism and a lever mechanism are formed by cutting out a single piece of parent material in the same manner as mentioned above, wherein a protruding part or a recessed part is formed on each beam of the above Roberval mechanism following the vertical direction orthogonal to the axial direction of each beam, and in addition, a stopper for restricting displacement of each beam is fixed to the fixed part of the above block-like mechanism unit facing opposite the protruding part or recessed part with a prescribed gap interposed in the axial direction of each beam.

In the above embodiments, displacement in the respective axial direction is restricted concerning the lever mechanism (first aspect) or the beams of the Roberval mechanism (second aspect), respectively, and by forming a protruding part or a recessed part following the vertical direction of the lever mechanism or the beams, and fixing a stopper on the fixed part of the block-like mechanism unit facing opposite the protruding part or recessed part with a prescribed gap interposed in the axial direction, the displacement of the lever or the beams is restricted to within the gap. Also, control of the gap is performed easily using a thickness gauge, or the like, and although restricted only in the axial direction in either case, a protective mechanism inside the force measurement cell is constructible with low cost.

The force measurement cell of an embodiment according to a further aspect of the invention includes a block-like mechanism unit in which a Roberval mechanism and a lever mechanism are formed by cutting out a single piece of parent material in the same manner as the above embodiments, wherein on both side surfaces orthogonal to the axial direction of the above lever mechanism, a recessed part which sinks from the respective side surface of the block-like mechanism unit is formed, and in addition, a stopper for restricting displacement of the lever mechanism is fixed to the fixed part of the above block-like mechanism unit facing opposite the bottom surface of the recessed part with a prescribed gap in between.

Also, the force measurement cell of a still further embodiment of the invention includes a block-like mechanism unit in which a Roberval mechanism and a lever mechanism are formed by cutting out a single piece of parent material in the same manner as mentioned above, wherein on both side surfaces orthogonal to the axial direction of each above beam, a recessed part which sinks from the respective side surface of the block-like mechanism unit is formed, and in addition, a stopper for restricting displacement of each beam is fixed to the fixed part of the above block-like mechanism unit facing opposite the bottom surface of the recessed part with a prescribed gap in between.

In the embodiments pertaining to the third and fourth aspects, displacement in the horizontal direction orthogonal to the respective axial direction is restricted concerning the lever mechanism (third aspect) or the beams of the Roberval mechanism (fourth aspect), respectively, and by forming a recessed part which sinks from the respective side surface of the block-like mechanism unit on both side surfaces orthogonal to the axial direction of the lever mechanism or the beams, and fixing a stopper on the fixed part of the block-like mechanism unit facing opposite the protruding part or recessed part with a prescribed gap opened, the displacement in the horizontal direction orthogonal to the axial direction of the lever mechanism or the beams can be restricted to the gap. Also, control of the gap is performed easily by controlling the depth of the recessed part, and in this case, although it is restricted only in a horizontal direction orthogonal to the axial direction in either case, a protective mechanism inside the force measurement cell is constructible with low cost.

According to an embodiment of the present invention, by applying simple machining to the block-like mechanism unit and also fixing a simple stopper by a screw, or the like, displacement of the lever mechanism or the beams of the Roberval mechanism is restricted in a required direction, and a protective mechanism inside the force measurement cell is constructible with low cost, and by combining with a protective mechanism outside the force measurement cell as exemplified in FIG. 7, damage to the movable parts inside the force measurement cell is preventable even under the action of vibrations during transport and strong impact loads, such as when falling.

A force measurement cell, comprising an internal protective mechanism restricting displacement in mutually orthogonal directions on the horizontal plane of a lever mechanism and protects these from vibrations during transport and impact loads, was realized based on a simple construction.

DETAILED DESCRIPTION OF PREFERRED EMBODIMENTS

Below, embodiments of the present invention are explained with reference to the accompanying drawings.

Figure 1:
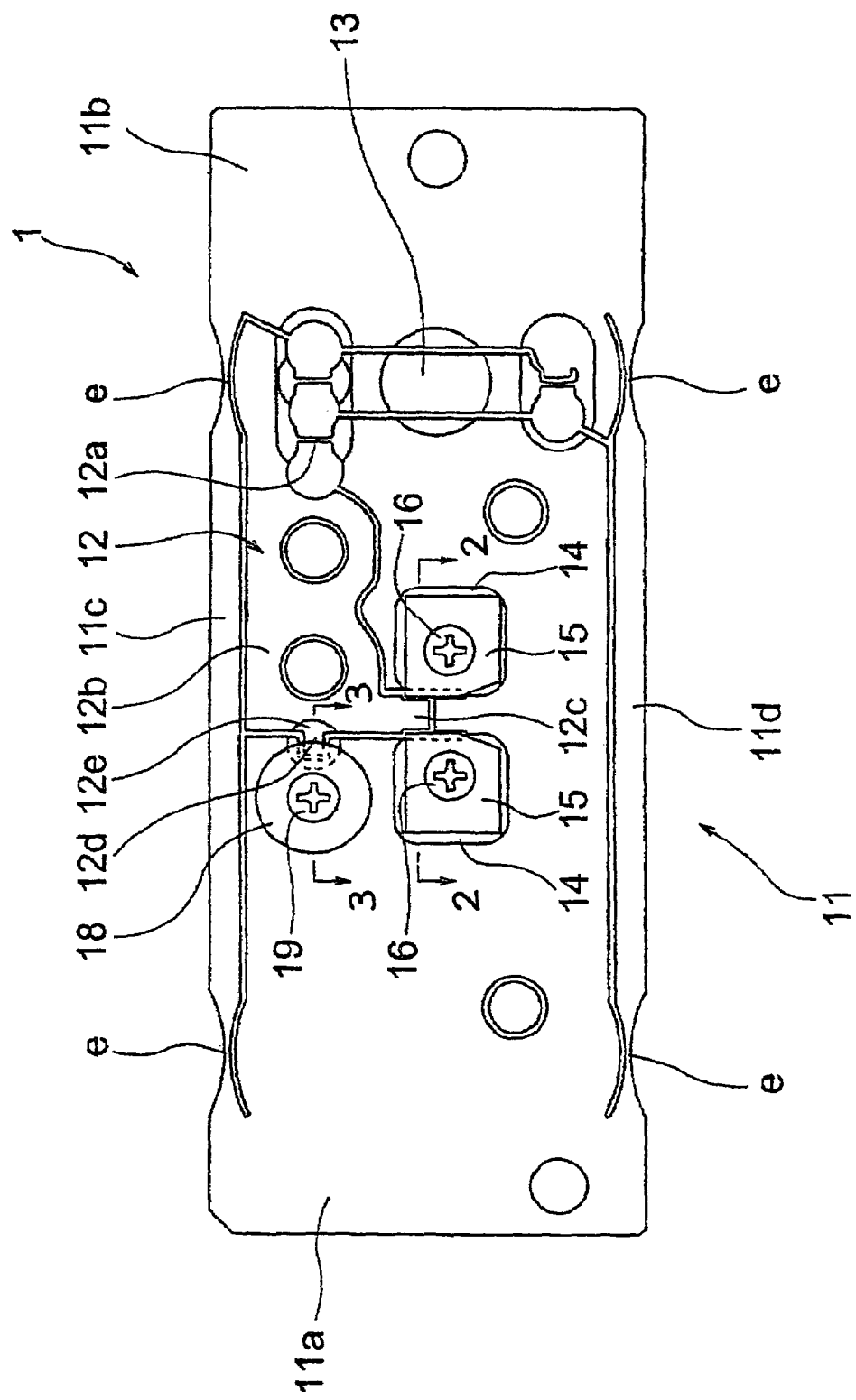
FIG. 1 is a front view of an embodiment of the present invention.
Figure 2:
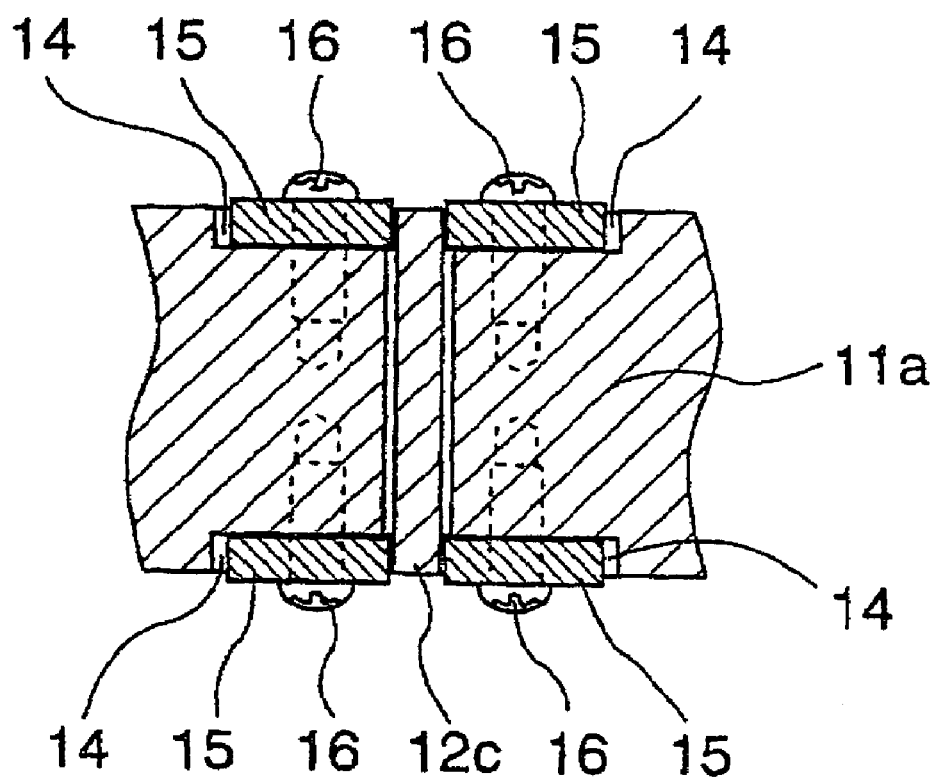
FIG. 2 is a sectional view taken along line 2—2 in FIG. 1.
Figure 3:
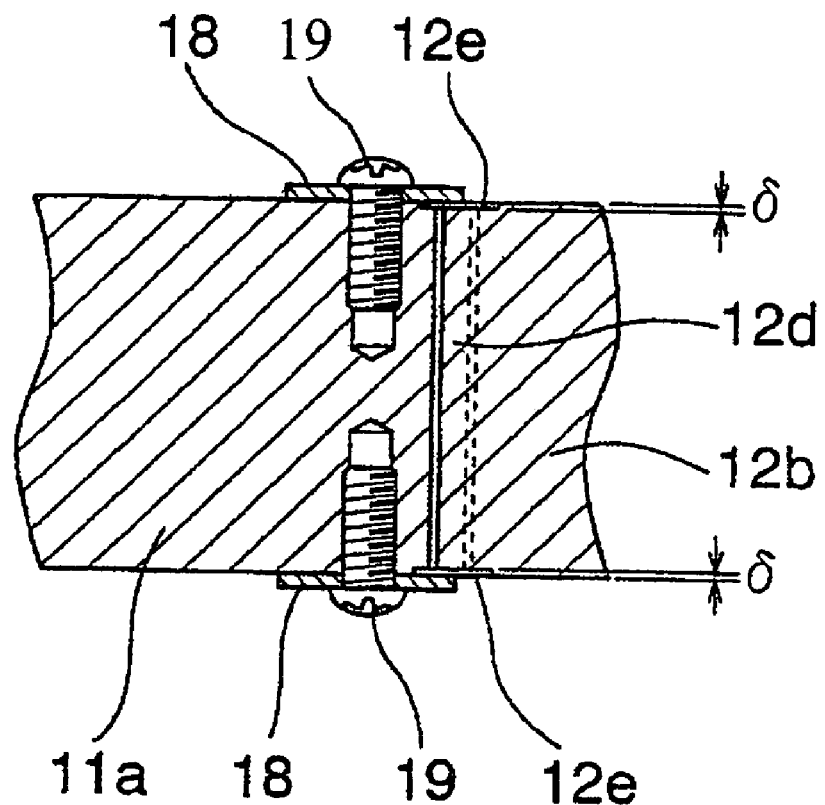
FIG. 3 is a sectional view taken along line 3—3 in FIG. 1.

As depicted in FIG. 1, a block-like mechanism unit 1 constituting the force measurement cell is roughly hexahedral as a whole, and has a Roberval mechanism 11 and a lever mechanism 12, as well as a connecting part 13 connecting these, formed by cutting out a single piece of parent material by wire discharge cutting. The Roberval mechanism 11 has a structure in which a fixed column 11a and a movable column 11b are connected by two mutually parallel beams 11c and 11d, above and below, and flexible parts e are formed on both ends of each beam 11c and 11d. Also, the lever mechanism 12 consists mainly of a lever main unit 12b which tilts freely centered on a fulcrum 12a.

Figure 4:
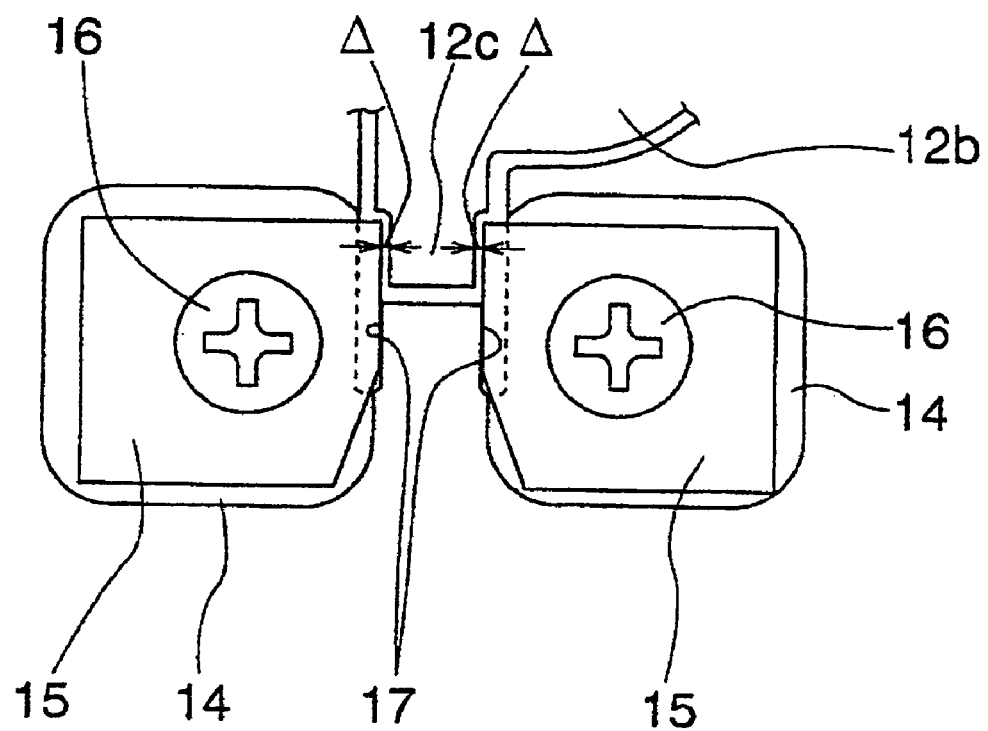
FIG. 4 is en enlarged front view in the vicinity of the protruding part 12c in an embodiment of the present invention.

A protruding part 12c which protrudes downward is formed on the lever main unit 12b. On both sides of protruding part 12c, a total of four spot facing parts 14 cut into the respective surface are formed on both the front and back surfaces of the elongated part of the fixed column 11a of the block-like mechanism unit 1, and a stopper 15 consisting of a flat plate-shaped member is fixed by a screw 16 in each of these spot facing parts 14. Also, protruding part 12c of lever main unit 12b and each stopper 15, as an enlarged front view of the vicinity of the protruding part 12c is shown in FIG. 4, respectively are made to face oppositely with a gap of a prescribed minute measurement Δ in the axial direction of the lever main unit 12b.

By the protruding part 12c of the lever main unit 12b and the stoppers 15 above, the displacement in the axial direction of the lever main unit 12b can be restrained to within Δ. Here, this measurement A is simply set by fixing with a screw 16 in a state having put the stoppers 15 in contact with a bump 17 formed on the fixed column 11a, or by using a thickness gauge.

Also, a protrusion 12d protruding toward the left in FIG. 1 is formed on the lever main unit 12b, and a recessed part 12e which sinks by a prescribed measurement δ from the surface (both side surfaces) of the block-like mechanism unit 1 is formed in a prescribed area including the protrusion 12d. Also, a washer-like stopper 18 is fixed by a screw 19 to the fixed column 11a in a manner so as to be received by the protrusion 12d inside each of the recessed part 12e. The bottom surface of the stopper 18 is affixed closely to the surface (both side surfaces) of the block-like mechanism unit 1, and accordingly, a gap having the depth δ of the recessed part 12e is formed between the bottom surface of stopper 18 and the surface of the protrusion 12d. Accordingly, the displacement of lever main unit 12b in the horizontal direction orthogonal to the axial direction thereof is restrained to within the gap δ. Because the gap δ is equal to the depth of recessed part 12e, the gap can be set comparatively simply with high precision.

According to the above embodiment, by the addition of simple machining, it is possible to restrict in mutually orthogonal directions on the horizontal plane of the lever mechanism 12 inside the force measurement cell, and a protective mechanism for the force measurement cell is constructed with low cost.

Here, although the above embodiment was described concerning a protective mechanism related to the lever mechanism 12, a protective mechanism is constructible based on entirely the same construction also concerning upper and lower beams 11c and 11d of Roberval mechanism 11.

Figure 5:
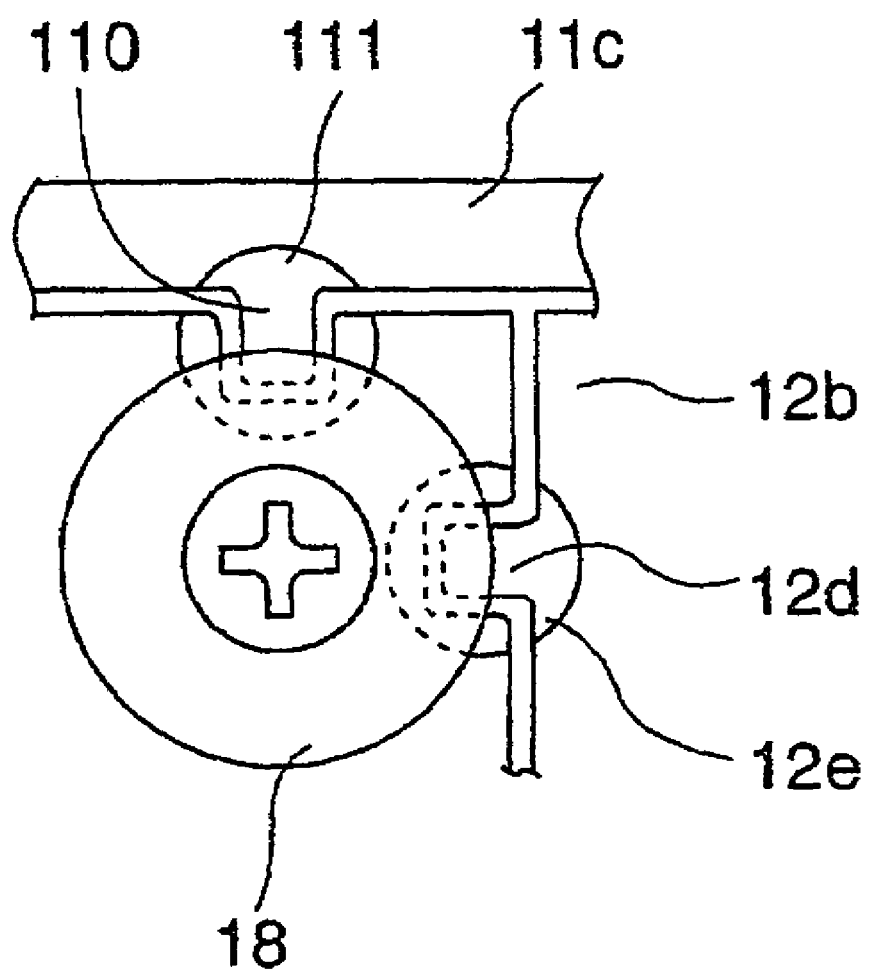
FIG. 5 is a front view of components of another embodiment of the present invention.

That is, as a front view of the components is shown in FIG. 5, a protrusion 110 protruding downward is formed on the upper beam 11c, and in addition, a recessed part 111 which sinks by a prescribed depth δ from the surface (both side surfaces) of the block-like mechanism unit 1 is formed in a prescribed area including the protrusion 110. Also, if the aforementioned stopper 18 for lever mechanism 12 is fixed in a manner so as to be received also by protrusion 110 inside recessed part 111, the displacement in the horizontal direction orthogonal to the axis of beam 11c along with lever main unit 12b is restrained to within δ by stopper 18. This mechanism is applicable also to lower beam 11d.

Figure 6:
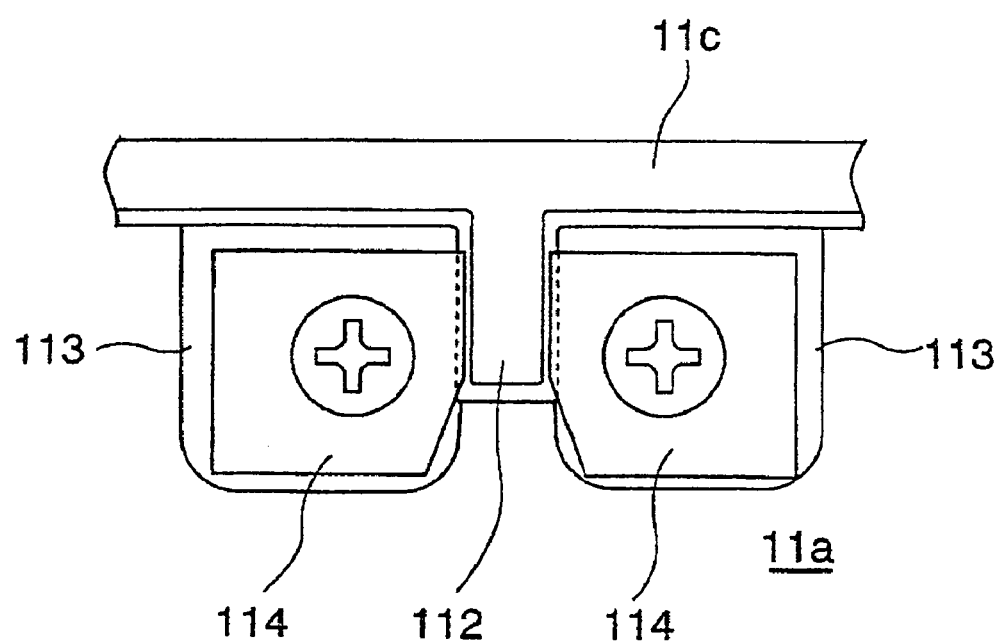
FIG. 6 is a front view of the essential components of yet another embodiment of the present invention.

Also, concerning a structure for restricting displacement in the axial direction of beams 11c and 11d, as a front view of the components is shown in FIG. 6, by forming a protruding part 112 protruding downward on beam 11c, and in addition, forming the same kind of spot facing 113 as for lever mechanism 12 on fixed column 11a on both sides and fixing a stopper 114 to the spot facing 113, such that a gap A is interposed between the protruding part 112 and the stopper 114. Similarly to lever mechanism 12, it is possible to restrain the displacement in the axial direction of beam 11c or 11d to within Δ.

Figure 7:
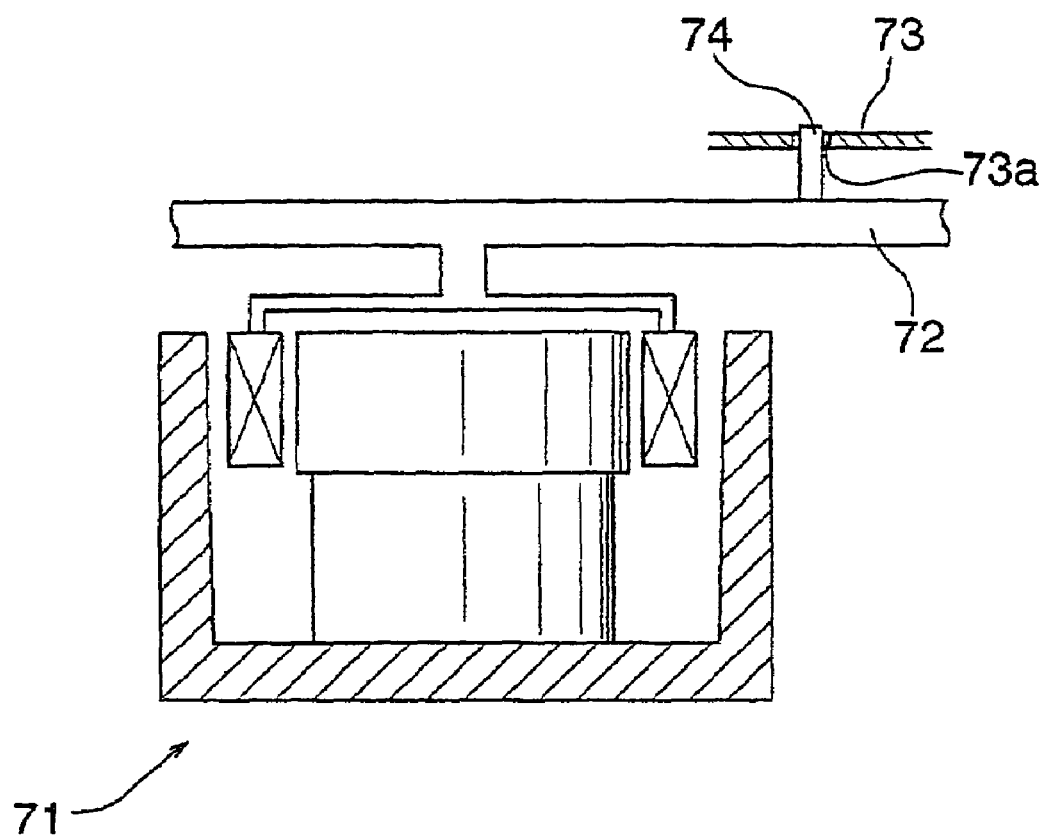
FIG. 7 is a drawing showing an example of a protective mechanism used in a conventional electronic balance, which comprises a stopper provided in the vicinity of an electromagnetic force generator in order to restrict displacement of a lever.

Also, in the case that such a force measurement cell pertaining to the present invention is used incorporated in an electronic balance, for example, the fixed column 11a is fixed to the base of the balance, and a tray is installed on the movable column 11b, and in addition, an elongated lever is fastened by screw to lever main unit 12b, and a movable coil of an electromagnetic force generator is attached to the front end of that elongated lever. However, by combined use of the protective mechanism outside the cell exemplified in the aforementioned FIG. 7, the displacement of the lever mechanism or the beam is restricted respectively in two locations, whereby the protection function of the lever mechanism or the beam is made more assured.

In the above embodiments, examples were described, in which a protruding part 12c or 112 was formed on lever main unit 12b or the beam 11c, or the like, and a gap Δ was provided between the protruding part and the stopper 15 or 114, as mechanisms for restricting displacement in the axial direction of the lever mechanism or the beam. However, an equivalent operational effect is performed even if constructed such that a recessed part is formed instead of a protruding part, a stopper is fixed to the fixed column such that it enters into the recess, and a gap Δ is formed between the inner surface of the recessed part and the stopper.

The disclosure disclosed in Japanese Patent Application No. 2003-299917 filed on Aug. 25, 2003 is incorporated herein.

While the invention has been explained with reference to the specific embodiments of the invention, the explanation is illustrative and the invention is limited only by the appended claims.

What is claimed is:

1. A force measurement cell, comprising:
   a block mechanism unit including
   a Roberval mechanism having a fixed part, a movable part on which a measured force acts, and parallel beams each having flexible parts on two ends for connecting the fixed part and the movable part; and
   a lever mechanism connected to the movable part of the Roberval mechanism to transmit a displacement of said movable part by the measured force to an outside,
   a gapped part provided on one of said lever mechanism and said Roberval mechanism and oriented in a vertical direction orthogonal to an axial direction of one of said lever mechanism and said Roberval mechanism, and
   a stopper for restricting displacement of one of said lever mechanism and said Roberval mechanism, the stopper being fixed to the fixed part of said block mechanism unit facing opposite said gapped part with a prescribed gap opened in the axial direction of one of said lever mechanism and said Roberval mechanism.

2. A force measurement cell according to claim 1, wherein said Roberval mechanism and said lever mechanism are formed of a same material cut separately.

3. A force measurement cell according to claim 1, wherein the gapped part is at least one of a protruding part and a recessed part.

4. A force measurement cell according to claim 1, wherein the gapped part is provided on each of said beams of said Roberval mechanism oriented in the vertical direction orthogonal to the axial direction of each of said beams, and the stopper for restricting displacement of each of said beams is fixed to the fixed part of said block mechanism unit facing opposite said gapped part with a prescribed gap opened in the axial direction of each beam.

5. A force measurement cell, comprising:
   a block mechanism unit including
   a Roberval mechanism having a fixed part, a movable part on which a measured force acts, and parallel beams each having flexible parts on two ends for connecting the fixed part and the movable part; and a lever mechanism connected to the movable part of the Roberval mechanism to transmit a displacement of said movable part by a measured force to an outside, a recessed part provided on two side surfaces orthogonal to an axial direction of one of said lever mechanism and said Roberval mechanism, said recessed part extending downward from the block mechanism unit, and a stopper for restricting displacement of one of said lever mechanism and said Roberval mechanism, the stopper being fixed to the fixed part of said block mechanism unit facing opposite a bottom surface of said recessed part with a prescribed gap between said stopper and said bottom surface of the recessed part.

6. A force measurement cell according to claim 5, wherein said recessed part is provided on each of said parallel beams of said Roberval mechanism.

7. A force measurement cell according to claim 1, further comprising a contact member provided in the fixed part of the block mechanism unit for fixedly contacting a first stopper and a second stopper, wherein the gapped part is interposed between the first stopper and the second stopper.

8. A force measurement cell according to claim 7, wherein the first stopper and the second stopper each have a first opposed portion and a second opposed portion, and the contact member fixedly contacts the first opposed portions of the first stopper and the second stopper, and the gapped part is interposed between the second opposed portions of the first stopper and the second stopper.

9. A force measurement cell according to claim 7, wherein the displacement of the gapped part is restricted to movement between the first stopper and the second stopper.

* * * * *